United States Patent Office 3,513,137
Patented May 19, 1970

3,513,137
PROCESS FOR POLYMERIZING ARYL OXALATES AND PRODUCTS THEREOF
Peter Salvatore Forgione, Stamford, Conn., assignor to American Cyanamid Company, Stamford, Conn., a corporation of Maine
No Drawing. Original application June 7, 1963, Ser. No. 286,212, now Patent No. 3,431,278, dated Mar. 4, 1968. Divided and this application July 23, 1968, Ser. No. 746,732
Int. Cl. C08f 5/00
U.S. Cl. 260—78.5     7 Claims

ABSTRACT OF THE DISCLOSURE

A method for increasing the heat distortion temperature, the glass transition temperature and the hardness of a vinyl polymer comprising polymerizing a vinyl monomer with an aryl oxalate and the resulting polymers per se, are disclosed.

CROSS-REFERENCES TO RELATED APPLICATIONS

This application is a division of my copending application, Ser. No. 286,212, filed June 7, 1963 and now U.S. Pat. No. 3,431,278.

BACKGROUND OF THE INVENTION

The production of polymeric materials, both homopolymers and copolymers, from vinyl type monomers is well known in the art. These polymers have properties which render them useful for many applications for which other type polymers are unfit. There are, however, some properties of these vinyl type polymers which render them inapplicable for certain purposes. That is to say, such properties as the heat distortion temperature, glass transition temperature and hardness of many vinyl polymers are not sufficiently high to enable their use in applications where hard, thermally stable properties are needed, such as coatings, laminates, moldings, castings and the like, wherein the polymers in these forms, are utilized in areas of application wherein they are subjected to conditions of high temperature.

Normally, when vinyl monomers are copolymerized with various other copolymerizable monomers, the heat distortion temperature and glass transition temperature of the copolymers are lower than that of the homopolymers of the vinyl monomers themselves. For example, such a phenomena is discussed in articles by White, Trans. Farad. Soc., vol. 56, p. 1529, 1960 and Beevers, Trans. Farad. Soc., vol. 58, p. 1465, 1962. One method for increasing these properties of the vinyl homopolymers has been to cross-link the homopolymer via other reactionable groups present.

SUMMARY

I have now found that vinyl type polymers may be produced, which polymers possess glass transition temperatures, heat distortion temperatures and hardness superior to those of the unmodified vinyl polymer. By modifying the vinyl polymer, I have found that these properties are greatly enhanced. The increase in glass transition temperature, heat distortion temperature and hardness results from my novel process of copolymerizing the vinyl monomer with an aryl oxalate.

The polymeric products produced by the process of the present invention are useful as such for any application in which the usual vinyl polymer is used. However, in view of the fact tht the thermal stability and hardness of the polymers are increased they are also useful for applications, i.e. coatings, molded articles and the like wherein they must withstand higher temperatures and be of a more durable nature than their unmodified counterparts, i.e. homo- or copolymers.

DESCRIPTION OF THE INVENTION INCLUDING PREFERRED EMBODIMENTS

As mentioned above, I have discovered a method for increasing the glass transition temperature, the heat distortion temperature and hardness of vinyl polymers. This method comprises copolymerizing the vinyl monomer, or mixture of vinyl monomers, with at least 1%, by weight, based on the weight of the vinyl monomer, of a compound having the formula (I) 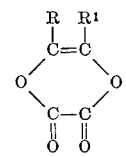

wherein R and R' are hydrogen or an aryl radical having from 6 to 10 carbon atoms, inclusive, at least one of said R and R' being an aryl radical.

My invention is further enhanced by the fact that the polymerization procedure employed is not critical and any known procedure for the polymerization of a vinyl monomer or mixtures of vinyl monomers may be employed.

A method which may be used for example, and which is perhaps preferred because of its efficacy of execution, comprises conducting the polymerization in the presence of a free-radical generating catalyst and a polymerization regulator, at temperatures of from about 10° C. to 90° C. Any known free-radical generating catalyst which initiates the polymerization of vinyl monomers, for example, methyl methacrylate, may be used. Suitable catalysts include the organic peroxides such as methyl ethyl ketone peroxide, benzoyl peroxide; the hydroperoxides such as cumene hydroperoxide; the persulfate type compounds such as potassium persulfate, or catalysts such as azobisisobutyronitrile and the like. Additionally, such catalysts as lauroyl peroxide, 2,5-dimethyl-2,5-di(t-butylperoxy)hexane, the dialkyl peroxides, e.g., diethyl peroxide, t-butyl peroxypivalate, dipropyl peroxide, dilauryl peroxide, di(tertiary-butyl)peroxide and di-(tertiary-amyl)peroxide, such peroxides often being designated as ethyl, propyl, lauryl, tertiary-butyl and tertiary-amyl peroxides; the alkyl hydrogen peroxides, e.g., tertiary-butyl hydrogen peroxide (tertiary-butyl hydroperoxide), tertiary-amyl hydrogen peroxide (tertiary-amyl hydroperoxide), etc.; symmetrical diacyl peroxides, for instance, peroxides which commonly are known under such names as acetyl peroxide, propionyl peroxide, phthaloyl peroxide, benzoyl peroxide, etc.; unsymmetrical or mixed diacyl peroxides, e.g., acetyl benzoyl peroxide, propionyl benzoyl peroxide, etc.; and salts of inorganic per-acids, e.g. ammonium persulfate, sodium persulfate, sodium percarbonate, potassium percarbonate, sodium perborate, potasium perborate, sodium perphosphate, potassium perphosphate, etc. Other examples of organic peroxide catalysts which may be employed are the following: tertiary-butyl diperphthalate, tertiary-butyl perbenzoate, 2,4-dichlorobenzoyl peroxide, p-chlorobenzoyl peroxide, 2,2-bis(teritary-butylperoxy)butane, hydroxyheptyl peroxide, the diperoxide of benzaldehydrde, azobisisobutyronitrile and the like. Generally the water-soluble, as well as the monomer-soluble, types of catalysts may be employed in amounts ranging from about 0.05 to 5.0 percent, by weight, of the monomer employed.

Emulsion polymerization procedures may also be employed, with any available emulsifier being used, with compounds such as fatty acid soaps, rosin soaps, sodium lauryl sulfate, non-ionic emulsifiers such as polyethoxy alkylated phenols, compounds such as dioctyl sodium sulfosuccinate, dihexyl sodium sulfosuccinate and the like being exemplary, in amounts ranging from about 1% to 8%, by weight, preferably 4% to 5%, by weight, based on the amount of monomer or monomers employed.

Various other polymerization procedures, such as solution polymerization, may also be employed, the choice being governed by the monomer, etc. and by the discretion of the skilled artisan conducting the production of the polymer.

Polymerization regulators may be used in any of these processes, with compounds such as the organic sulfur compounds, i.e. the thio acids, mercaptans such as benzyl mercaptan, aliphatic mercaptans possessing at least 6 carbon atoms such as octyl, dodecyl and tertiary dodecyl mercaptan, mixtures of mercaptans such as are obtained from lauryl alcohol, nitrohydroazine, amino compounds, carbon tetrachloride, any other well known polymerization modifier or regulator, being exemplary. It is preferred however, to use the alkyl mercaptans of low water solubility, such as dodecyl mercaptan in amounts ranging from about 0.01% to 5.0%, by weight, of the monomers employed.

The invention is further enhanced by the fact that substantially all of the known vinyl polymers are materially improved by my novel process. That is to say, such monomers as methyl methacrylate, styrene, acrylonitrile, and the like may be used and when copolymerized with the aryl vinylene oxalate, result is polymers having higher heat distortion and glass transition temperatures and greater hardness than a homo or copolymer produced from the vinyl monomer or monomers alone. The preferred monomers which may be used to produce the vinyl polymers which are enhanced in properties by my novel process are the methacrylic acid esters of the formula (II)
$$CH_2=C-\overset{\overset{O}{\|}}{C}-O-R$$
$$\overset{|}{CH_3}$$

wherein R represents an alkyl radical containing from 1 to 6 carbon atoms, inclusive. Compounds which are represented by the above formula and consequently may be used in the present invention include methyl methacrylate, ethyl methacrylate, propyl methacrylate, isopropyl methacrylate, n-butyl methacrylate, isobutyl methacrylate, amyl methacrylate, hexyl methacrylate, and the like. These monomers may be used singly or in combination with one another when being reacted with the oxalate. The molecular weights of any of the vinyl polymers employed are not critical, however, we have found that the higher molecular weight polymers tend to produce the more thermally stable compositions.

Other examples of monomers which can be utilized alone, with the monomers represented by Formula I or with one another, when being reacted with the oxalate to produce my novel polymers, are such monomers as the unsaturated alcohol esters, more particularly the allyl, methallyl, crotyl, vinyl, methvinyl, etc., esters of saturated and unsaturated aliphatic and aromatic monobasic and polybasic acids such, for instance, as acetic, propionic, butyric, valeric, caproic, crotonic, oxalic, benzoic, phenylacetic, phthalic, terephthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic and polybasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetrachlorostyrenes, -bromostyrenes, -fluorostyrenes, -methylstyrenes, -ethylstyrenes, -cyanostyrenes, etc., vinyl naphthalene, vinylcyclohexane, vinyl pyridine, divinyl benzene, trivinyl benzene, diallyl benzene, the various alpha-substituted styrenes and alpha-substituted ring-substituted styrenes, e.g., alpha-methylstyrene, alpha-methyl-para-methyl styrene, etc.; unsaturated amides, for instance, acrylamide, and N-substituted acrylamides, e.g., N-methylol acrylamide, N-allyl acrylamide, N-methyl acrylamide, N-phenyl acrylamide, and the like.

Among the monomers which are preferred for use in carrying my invention into effect are methyl methacrylate, styrene, and acrylonitrile, either alone or in combination. Other monomers which may be used are given, for instance, in U.S. Pat. No. 2,601,572, dated June 24, 1952, where examples are given both by class and species.

The improvement in the properties of glass transition temperature, heat distortion temperature and hardness resulting from my novel process accrues from the incorporation of at least 1%, by weight, based on the weight of the vinyl monomer, of an aryl vinylene oxalate represented by Formula I above. Examples of oxalates which may be used in the process of the present invention and are therefore represented by Formula I include phenyl vinylene oxalate, tolyl vinylene oxalate, xylyl vinylene oxalate, naphthyl vinylene oxalate, diphenyl vinylene oxalate, ditolyl vinylene oxalate, dixylyl vinylene oxalate, dinaphthyl vinylene oxalate, phenyltolyl vinylene oxalate, phenylxylyl vinylene oxalate, xylylnaphthyl vinylene oxalate and the like.

The vinylene oxalates are produced by reacting oxalyl chloride with an appropriately aryl substituted ketocarbinol in solution. The reaction occurs in two steps, the first of which results in the formation of a keto-half acid chloride ester and the second of which produces the desired oxalate.

The reaction, both steps included, proceeds as follows:

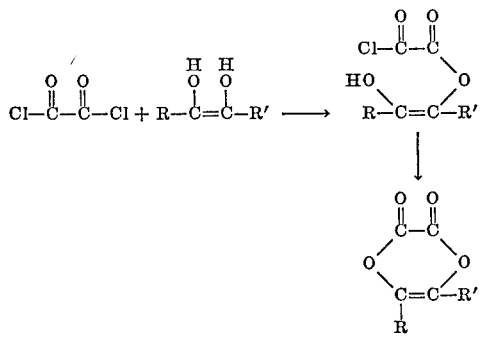

Both steps are conducted in the presence of an inert gas such as nitrogen, argon, neon, carbon dioxide and the like and both are conducted at atmospheric pressure, although higher or lower pressures may be used if desired or necessary. The temperature of the first step is maintained within the range of from about $-30°$ C. to about $50°$ C. and is conducted for from about 1 to 5 hours. The reaction is carried out in the presence of a solvent such as, for example, the aromatic hydrocarbons, i.e. benzene, toluene, xylene, etc., the aliphatic hydrocarbons, i.e. hexane, heptane and the like, dioxane, petroleum ether, tetrahydrofuran, etc. An excess of the oxalyl chloride is generally preferred since it enables substantially complete reaction of the active ingredients and assures the production of the half ester rather than other undesired side reactions. The second step is conducted at temperatures ranging from about $180°$ C. to about $250°$ C. for from about 2 to 24 hours.

The resultant oxalates are crystalline solids, yellowish in color and useful for the applications more fully set forth hereinabove.

There may be added to the novel products of the present invention during or after the polymerization, such ingredients as light stabilizers, heat stabilizers, anti-oxidants, lubricants, plasticizers, pigments, fillers, dyes and the like, without detracting from the unique properties of our novel molding compositions.

The following examples are set forth for purposes of illustration only and are not to be construed as limitations on the present invention except as set forth in the appended claims. All parts and percentages are by weight unless otherwise specified.

EXAMPLE 1

Preparation of phenyl vinylene oxalate

To a suitable reaction vessel equipped with a stirrer, reflux condenser and a nitrogen inlet tube and containing dry heptane and 20 parts of oxalyl chloride are slowly added, at −15° C., 10 parts of benzoyl carbinol. The mixture is allowed to stir at room temperature for three hours and then at reflux for four hours, while flushed with nitrogen. The heptane solvent is then evaporated under vacuum and diphenyl ether is added. This mixture is then heated at 220° C. for three hours and then at 160° C. for 15 hours; again in a nitrogen atmosphere. Upon cooling, crystals deposit, which on recrystallization from hot toluene afford 6.8 parts of yellow phenyl vinylene oxalate, M.P. 174–175° C.

*Analysis.*—Calcd. for $C_{10}H_6O_4$ (percent): C, 63.15; H, 3.15; molecular weight 190. Found (percent): C, 63.00; H, 3.23; molecular weight in $CH_3CN$ 187.1.

EXAMPLE 2

Following the procedure of Example 1, oxalyl chloride is reacted with benzoin to produce 6.0 parts of diphenyl vinylene oxalate, a yellowish crystalline solid.

EXAMPLE 3

Methyl methacrylate-phenyl vinylene oxalate copolymer

A degassed mixture of 6.1 parts of methyl methacrylate, 4.4 parts of phenyl vinylene oxalate and .02 part of azobisisobutyronitrile as catalyst is heated to 60° C. for 7 hours. The polymer is dissolved in chloroform and precipitated in methanol affording 5.5 parts of polymer. This copolymer has an intrinsic viscosity (dl./g.) in chloroform at 30° of 1.5 and analyzed (quantitative infrared) for 0.4 weight percent vinylene oxalate. The glass transition temperature (DTA method) for this copolymer is 124° C.

Following the procedure of Example 3, the following examples were run varying the modifier oxalate and the monomer copolymerized therewith. The results are given below in Table I.

TABLE I

| Ex. | Vinyl Monomer(s) | Oxalate |
|---|---|---|
| 4 | Methyl methacrylate/acrylonitrile (50/50). | Phenyl vinylene oxalate. |
| 5 | Acrylonitrile | Tolyl vinylene oxalate. |
| 6 | Methyl methacrylate | Phenyltolyl vinylene oxalate. |
| 7 | Methyl methacrylate/styrene (50/50). | Diphenyl vinylene oxalate. |
| 8 | Acrylonitrile/styrene (75/25) | Naphthyl vinylene oxalate. |

In each instance, Examples 4–8 the glass transition temperature and the Vicat softening temperature were materially increased over that of the homo or copolymer produced with the vinyl monomers alone.

I claim:
1. A vinyl polymer characterized by its high glass transition temperature, high heat distortion temperature and hardness comprising a polymer of at least one vinyl monomer and at least about 1%, by weight, based on the weight of the vinyl monomer, of a copolymerizable monomer copolymerized through the

group thereof and having the formula

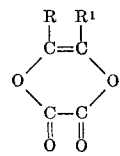

wherein R and $R^1$ are selected from the group consisting of hydrogen and an aryl radical having from 6–10 carbon atoms, inclusive, at least one of said R and $R^1$ being an aryl radical selected from the group consisting of phenyl, tolyl, xylyl and naphthyl radicals.

2. A method for producing a polymer of claim 1 which comprises polymerizing, in the presence of a free-radical generating catalyst, at least one vinyl monomer with at least 1%, by weight, based on the weight of the vinyl monomer, of a compound having the formula

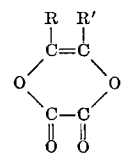

wherein R and R' are selected from the group consisting of hydrogen and an aryl radical having from 6 to 10 carbon atoms, inclusive, at least one of said R and R' being an aryl radical selected from the group consisting of phenyl, tolyl, xylyl and naphthyl radicals.

3. A method according to claim 2 wherein said compound is phenyl vinylene oxalate.

4. A method according to claim 2 wherein said vinyl monomer is methyl methacrylate.

5. A vinyl polymer according to claim 1 wherein said compound is phenyl vinylene oxalate.

6. A vinyl polymer according to claim 1 wherein said vinyl monomer is methyl methacrylate.

7. A vinyl polymer according to claim 1 wherein said vinyl monomer is methyl methacrylate and said compound is phenyl vinylene oxalate.

References Cited

UNITED STATES PATENTS 3,359,240    12/1967    Hubbard et al. _____ 260—340.2
3,431,278    3/1969    Forgione _____ 260—340.2

HARRY WONG, Jr., Primary Examiner

U.S. Cl. X.R.
260—33.8, 340.2